(12) United States Patent
Jung et al.

(10) Patent No.: US 9,326,178 B2
(45) Date of Patent: Apr. 26, 2016

(54) METHOD FOR MEASURING AND REPORTING CSI-RS IN WIRELESS COMMUNICATION SYSTEM, AND APPARATUS FOR SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/411,726

(22) PCT Filed: Jul. 1, 2013

(86) PCT No.: PCT/KR2013/005809
§ 371 (c)(1),
(2) Date: Dec. 29, 2014

(87) PCT Pub. No.: WO2014/003506
PCT Pub. Date: Jan. 3, 2014

(65) Prior Publication Data
US 2015/0195731 A1    Jul. 9, 2015

Related U.S. Application Data

(60) Provisional application No. 61/665,909, filed on Jun. 29, 2012, provisional application No. 61/674,265, filed on Jul. 20, 2012, provisional application No. 61/674,401, filed on Jul. 23, 2012.

(51) Int. Cl.
*H04L 12/28* (2006.01)
*H04W 24/10* (2009.01)
(Continued)

(52) U.S. Cl.
CPC ............. *H04W 24/10* (2013.01); *H04B 7/024* (2013.01); *H04L 5/0048* (2013.01); *H04L 5/0094* (2013.01); *H04W 24/08* (2013.01); *H04W 52/146* (2013.01); *H04L 5/0035* (2013.01)

(58) Field of Classification Search
CPC .......... H04B 7/0632; H04B 7/04; H04B 7/26; H04B 7/024; H04W 24/10
USPC .......................................... 370/329, 328, 332
See application file for complete search history.

(56) References Cited

U.S. PATENT DOCUMENTS

2003/0003880 A1*  1/2003  Ling .................... H04B 7/0417
                                            455/92
2011/0199986 A1*  8/2011  Fong .................... H04L 5/0035
                                            370/329
(Continued)

FOREIGN PATENT DOCUMENTS

KR    2003-0085040 A    11/2003
WO    WO 2010/143911 A2  12/2010
(Continued)

*Primary Examiner* — Khaled Kassim
*Assistant Examiner* — Berhanu Belete
(74) *Attorney, Agent, or Firm* — Birch, Stewart, Kolasch & Birch, LLP

(57) ABSTRACT

Provided is a method for measuring and reporting a channel state information-reference signal (CSI-RS) by a terminal in a wireless communication system. The method involves receiving a CSI-RS configuration from a network, the CSI-RS configuration including information indicating a plurality of CSI-RS resources that is an object to be measured, measuring the plurality of CSI-RS resources in order to acquire a plurality of CSI-RS measurement results, determining whether or not to report the CSI-RS measurement results, and transmitting a measurement report message to the network. The measurement report message includes a specific number of CSI-RS measurement results having a higher level of quality from among the plurality of CSI-RS measurement results.

11 Claims, 18 Drawing Sheets

(51) Int. Cl.
  *H04L 5/00* (2006.01)
  *H04W 24/08* (2009.01)
  *H04B 7/02* (2006.01)
  *H04W 52/14* (2009.01)

(56) References Cited

U.S. PATENT DOCUMENTS

| | | | |
|---|---|---|---|
| 2011/0200081 A1 | 8/2011 | Guo et al. | |
| 2012/0088458 A1* | 4/2012 | Nogami | H04B 7/0632 455/67.11 |
| 2012/0147773 A1* | 6/2012 | Kim | H04L 1/0025 370/252 |
| 2012/0155312 A1* | 6/2012 | Kim | H04W 24/10 370/252 |
| 2012/0201163 A1* | 8/2012 | Jongren | H04W 24/10 370/252 |
| 2013/0003788 A1* | 1/2013 | Marinier | H04B 7/024 375/219 |
| 2013/0028109 A1* | 1/2013 | Jongren | H04W 24/10 370/252 |
| 2013/0028182 A1* | 1/2013 | Geirhofer | H04L 5/0048 370/328 |
| 2013/0051240 A1* | 2/2013 | Bhattad | H04L 5/005 370/241 |
| 2013/0077513 A1* | 3/2013 | Ng | H04B 7/024 370/252 |
| 2013/0114431 A1* | 5/2013 | Koivisto | H04B 7/024 370/252 |
| 2013/0148515 A1* | 6/2013 | Ribeiro | H04L 5/0094 370/252 |
| 2013/0176978 A1* | 7/2013 | Abe | H04W 72/04 370/329 |
| 2013/0182648 A1* | 7/2013 | Abe | H04L 5/0048 370/328 |
| 2013/0260741 A1* | 10/2013 | Yamada | H04W 24/00 455/422.1 |
| 2013/0279343 A1* | 10/2013 | Jeong | H04W 24/10 370/241 |
| 2013/0286866 A1* | 10/2013 | Hammarwall | H04B 7/024 370/252 |
| 2013/0286997 A1* | 10/2013 | Davydov | H04B 7/024 370/329 |
| 2013/0294271 A1* | 11/2013 | Nagata | H04W 24/10 370/252 |
| 2014/0226582 A1* | 8/2014 | Zeng | H04B 7/0626 370/329 |

FOREIGN PATENT DOCUMENTS

| | | |
|---|---|---|
| WO | WO 2011/100672 A1 | 8/2011 |
| WO | WO 2012/061765 A1 | 5/2012 |

* cited by examiner

METHOD FOR MEASURING AND REPORTING CSI-RS IN WIRELESS COMMUNICATION SYSTEM, AND APPARATUS FOR SUPPORTING SAME

CROSS REFERENCE TO RELATED APPLICATIONS

This application is the National Phase of PCT International Application No. PCT/KR2013/005809, filed on Jul. 1, 2013, which claims priority under 35 U.S.C. 119(e) to U.S. Provisional Application No. 61/665,909, filed on Jun. 29, 2012, U.S. Provisional Application No. 61/674,265, filed on Jul. 20, 2012, and U.S. Provisional Application No. 61/674,401, filed on Jul. 23, 2012, all of which are hereby expressly incorporated by reference into the present application.

BACKGROUND OF THE INVENTION

1. Field of the invention

The present invention relates to wireless communication and, more particularly, to a method for measuring and reporting CSI-RS in a wireless communication system and an apparatus for supporting the same.

2. Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

In recent years, with the supply of smart phones, a request of a user wanting to receive a data service having a high level of quality regardless of time and location has been increased. Accordingly, there is a need capable of supporting high data rate to terminals located at an outer peripheral portion of a cell as well as a center of the cell. The center of the cell may increase a data transmission rate by supporting an additional antenna port by cells. However, since the outer peripheral portion of the cell may be significantly interfered with a peripheral cell, it may be difficult to increase the data rate greater than a certain limit without cooperation between cells. Further, in order for a user to provide a data service having a high rate in a dense zone, a reuse technology of a frequency through a small cell such as a Pico cell or a Femto cell in a zone of a Macro cell is supplied so that a requirement of a method of efficiently interference between transmission points has been increased.

A 3GPP provides a Coordinated Multi-Point transmission and reception (CoMP) scheme as a method of controlling the above interference. According to the CoMP, since the terminal simultaneously receives data through a Transmission Point (TP) such as a plurality of base stations or a plurality of antennas or receives the data from the best TP, a better service may be provided to the terminal. In order to provide the better service through the CoMP, uplink and downlink reference signals, channel state information of the terminal, a control channel structure, and a method of controlling uplink power have been continuously discussed.

SUMMARY OF THE INVENTION

The present invention provides a method for measuring and reporting CSI-RS in a wireless communication system and an apparatus for supporting the same.

In an aspect, a method for measuring and reporting a channel state information-reference signal (CSI-RS) by a terminal in a wireless communication system is provided. The method comprising: receiving a CSI-RS configuration from a network, the CSI-RS configuration including information indicating a plurality of CSI-RS resources that is an object to be measured; measuring the plurality of CSI-RS resources in order to acquire a plurality of CSI-RS measurement results; determining whether or not to report the CSI-RS measurement results; and transmitting a measurement report message to the network, wherein the measurement report message includes a specific number of CSI-RS measurement results having a higher level of quality from among the plurality of CSI-RS measurement results.

The determining whether or not to report the CSI-RS measurement results may comprise determining whether a specific number of CSI-RS resources associated with the specific number of CSI-RS measurement results are updated; and transmitting the measurement report message when the specific number of the CSI-RS resources are updated.

The determining whether the specific number of CSI-RS resources are updated may comprise determining that the specific number of CSI-RS resources are updated when the specific number of CSI-RS measurement results are acquired where the terminal does not previously transmit a measurement report message including the CSI-RS measurement result to the network.

The determining whether the specific number of CSI-RS resources are updated may comprise determining that the specific number of CSI-RS resources are updated when a specific number of previously transmitted CSI-RS resource associated with the specific number of CSI-RS measurement results which are previously transmitted is different from the specific number of the CSI-RS resources where the terminal previously transmits the measurement report message including the CSI-RS measurement result to the network.

The determining whether the specific number of CSI-RS resources are updated may comprise determining that the specific number of CSI-RS resources are updated when a quality level order of measurement results with respect to the specific number of previous CSI-RS resources is different from a quality order of measurement results with respect to the specific number of the CSI-RS resources where the terminal previously transmits the measurement report message including the CSI-RS measurement result to the network.

The measurement report message may comprise a specific number of CSI-RS IDs to identify the specific number of CSI-RS resources associated with the specific number of CSI-RS measurement results; and a report indicator indicating that the measurement report message is transmitted by updating the specific number of CSI-RS measurement results.

The measurement configuration message may further comprise information indicating a CSI-RS measurement result report period of the terminal.

The method may further comprise starting a period timer set at the CSI-RS measurement result report period corresponding to transmission of the measurement report message; and transmitting a next measurement report message when the period timer is terminated, wherein the next measurement report message comprises the specific number of CSI-RS measurement results having a higher level of quality from among the plurality of CSI-RS measurement results acquired by the terminal when the period timer is terminated.

The CSI-RS measurement configuration may comprise information indicating a CSI-RS measurement result report reference.

The determining whether or not to report the CSI-RS measurement results may comprise determining whether at least one of the plurality of CSI-RS measurement results satisfies the CSI-RS measurement result report reference; and transmitting the measurement report message to the network when the CSI-RS measurement result report reference is satisfied.

The plurality of CSI-RS resources may comprise measurement resources with respect to a plurality of transmission points (TPs) participating in coordinated multi-point transmission and reception (CoMP) operation with the terminal.

The CSI-RS configuration may be included in a measurement configuration set when the network measures and reports radio resource monitoring (RRM) in the terminal, and the measurement report message comprises a radio resource control (RRC) to be transmitted corresponding to the measurement configuration.

In another aspect, a wireless apparatus operating in a wireless communication system is provided. The wireless apparatus comprises: a Radio Frequency (RF) unit that sends and receives radio signals; and a processor that is functionally coupled to the RF unit and operates, wherein the processor is configured to: receive a CSI-RS configuration from a network, the CSI-RS configuration including information indicating a plurality of CSI-RS resources that is an object to be measured; measure the plurality of CSI-RS resources in order to acquire a plurality of CSI-RS measurement results; determine whether or not report the CSI-RS measurement results; and transmit a measurement report message to the network, wherein the measurement report message includes a specific number of CSI-RS measurement results having a higher level of quality from among the plurality of CSI-RS measurement results.

According to the method for measuring and reporting CSI-RS in a wireless communication system of the present invention, the terminal may report channel state information (e.g. CSI-RS measurement result) with respect to a plurality of TPs to a network through a more efficient method. The network may be set and operated to provide a more excellent quality service to the terminal in a coordinated communication side through best N CSI-RS measurement results. Wireless resource consumption may be reduced and a processing rate of a service provided to the terminal may be efficiently improved by applying an embodiment of the present invention.

DESCRIPTION OF EXEMPLARY EMBODIMENTS

Figure 1:
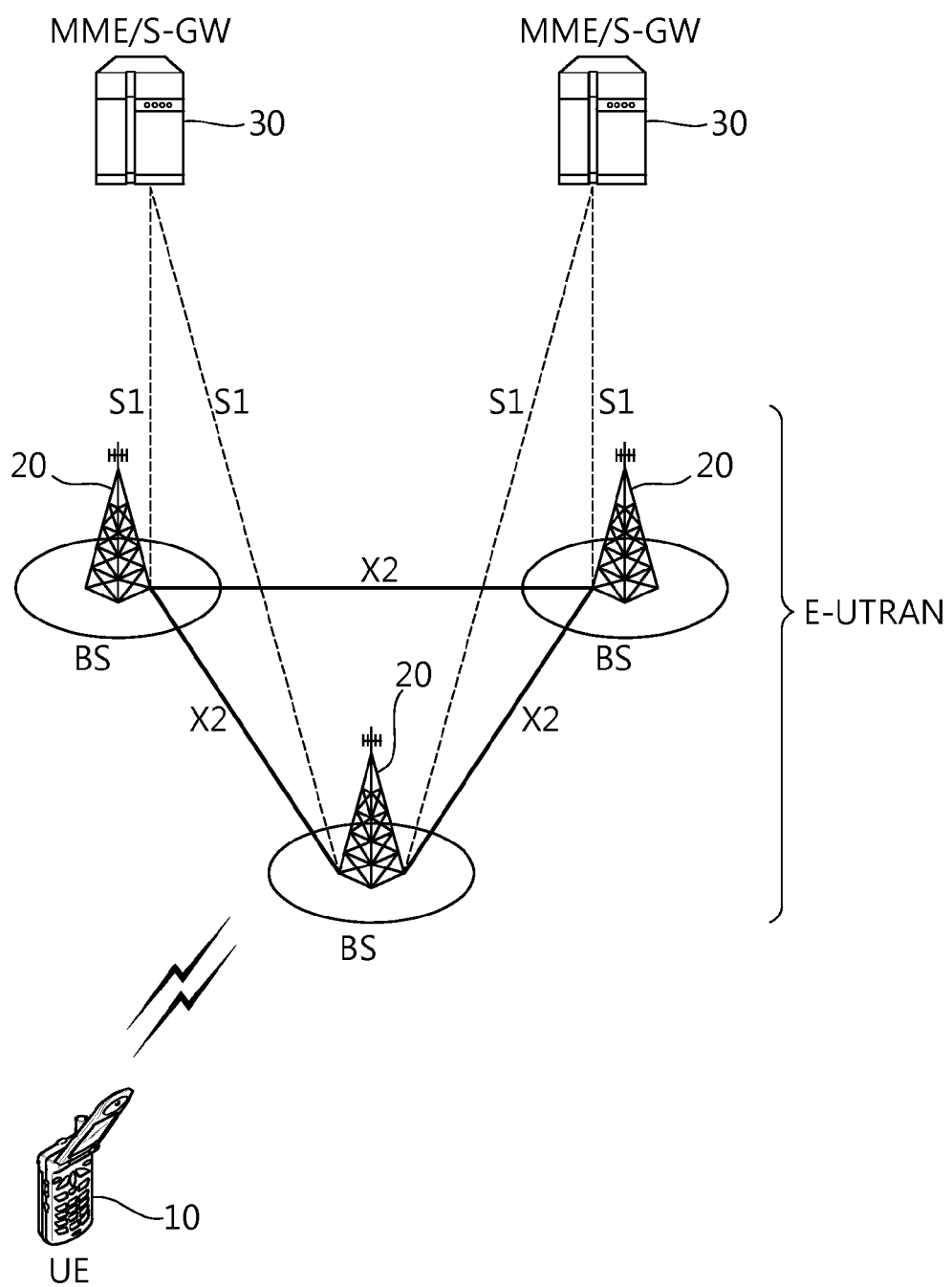
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
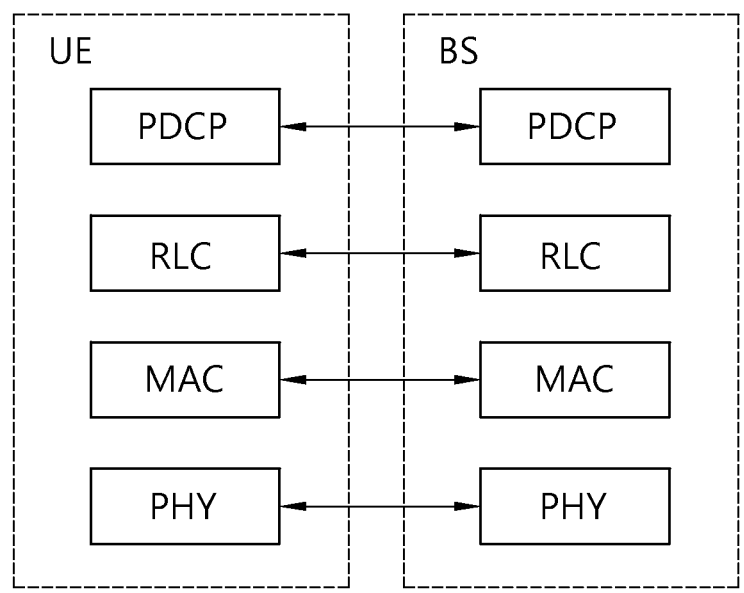
FIG. 2 is a block diagram illustrating a radio protocol architecture for a user plane.
Figure 3:
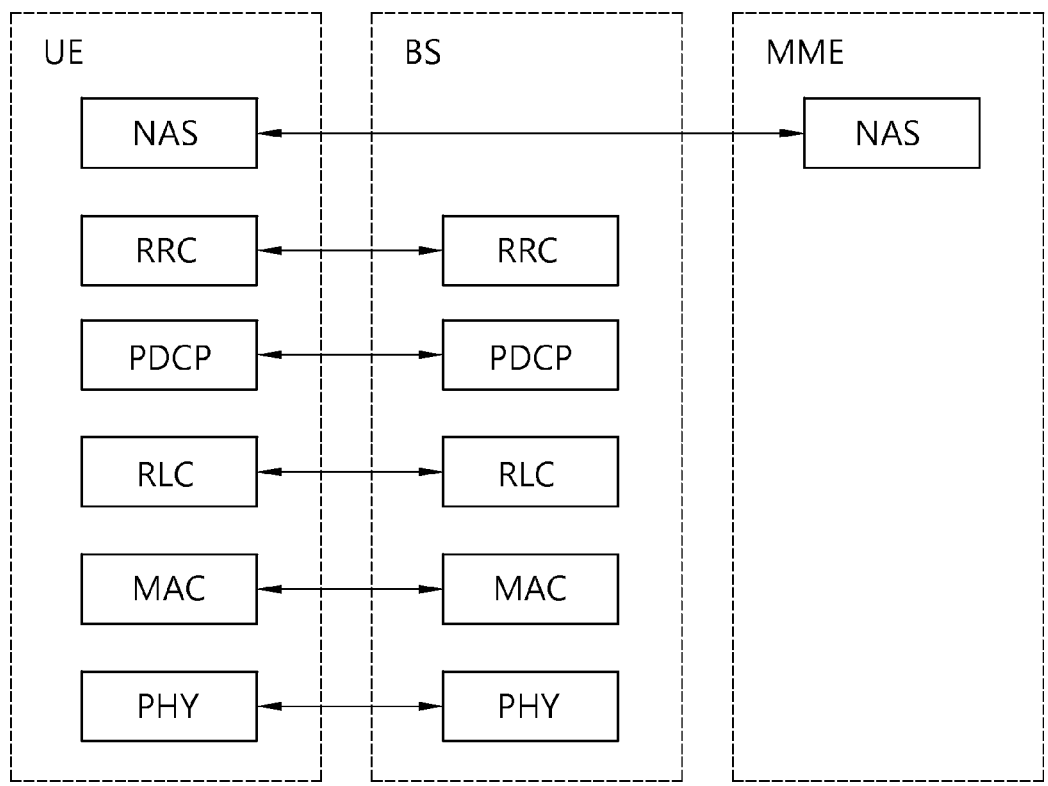
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information.

According to section 5.2.2 of 3GPP TS 36.331 V8.7.0 (2009-09) "Radio Resource Control (RRC); Protocol specification (Release 8)", the system information is divided into a master information block (MIB), a scheduling block (SB), and a system information block (SIB). The MIB allows the UE to know a physical configuration of the corresponding cell, for example, a bandwidth. The SB notifies transmission information of the SIBs, for example, a transmission period and the like. The SIB is a set of system information related to each other. For example, any SIB includes only information on a peripheral cell, and any SIB includes only information on an uplink radio channel used in the UE.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
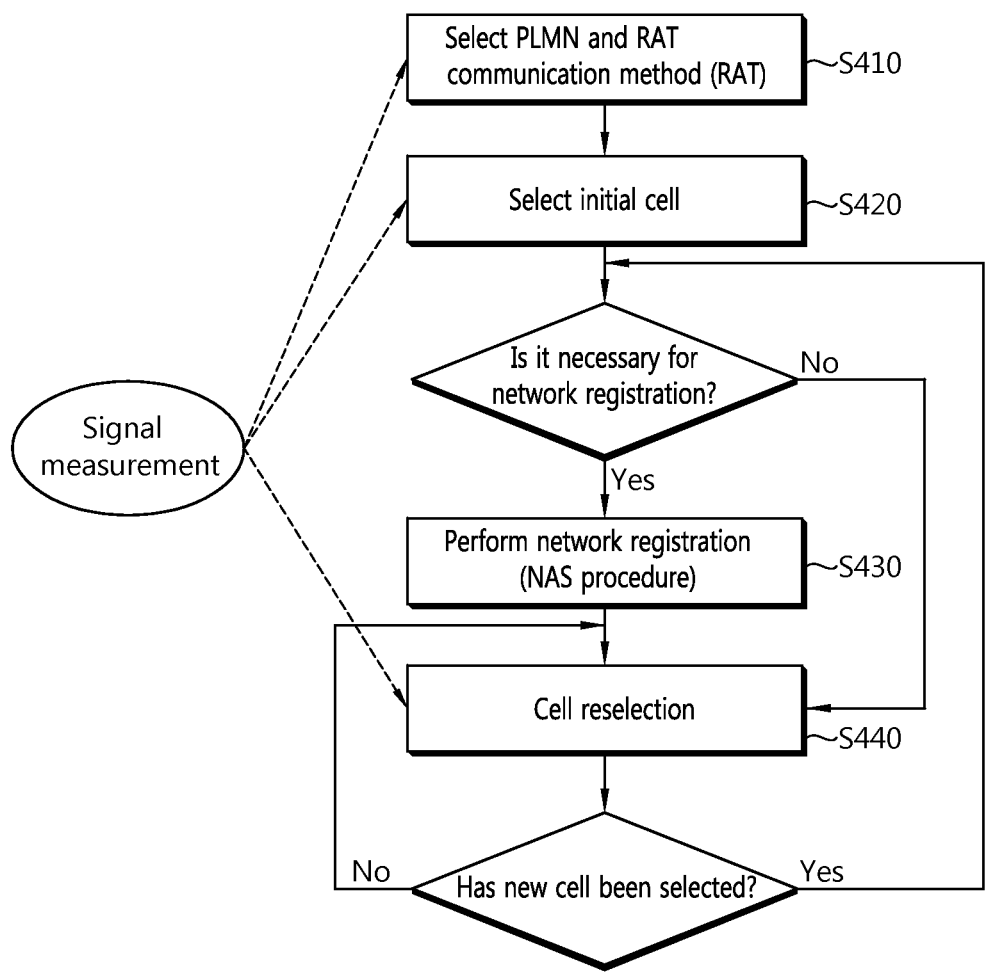
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
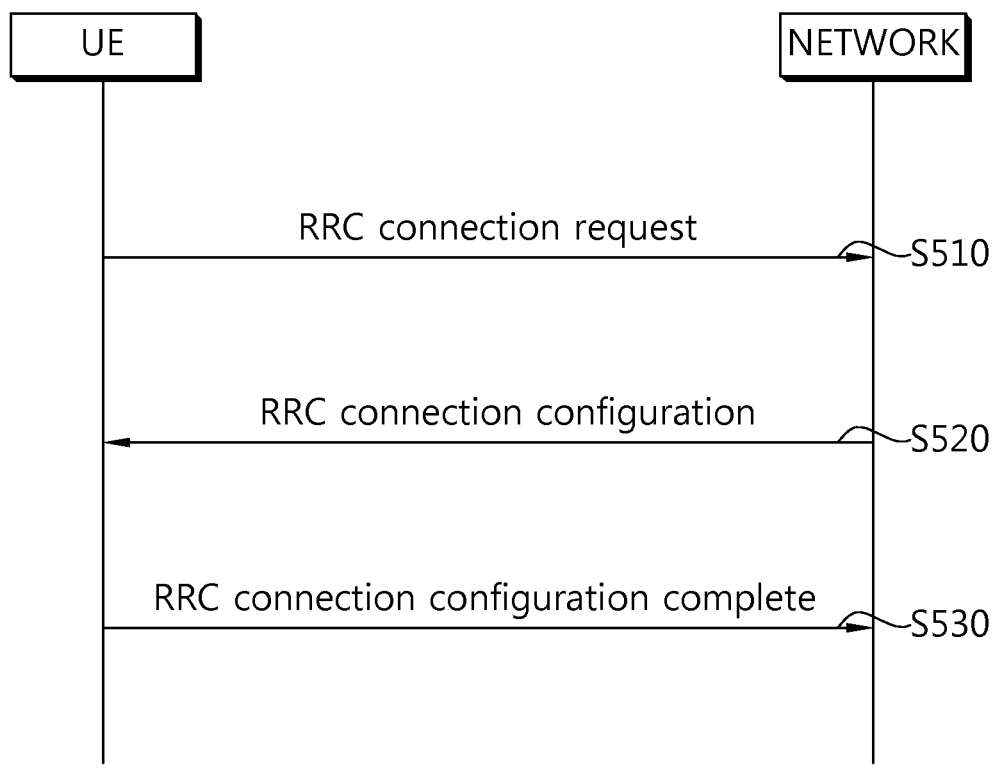
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
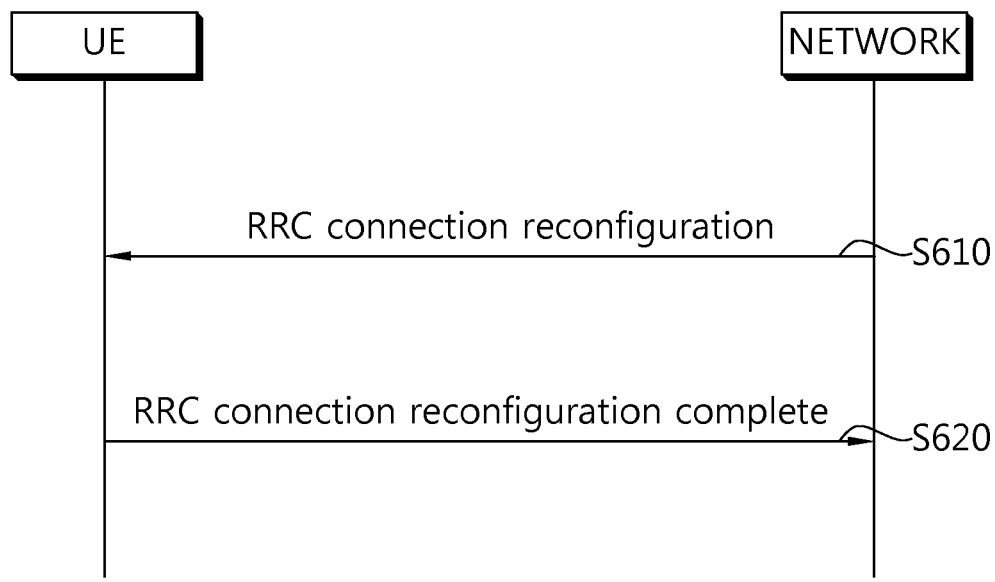
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, a public land mobile network (PLMN) is described.

The PLMN is a network which is disposed and operated by a mobile network operator. Each mobile network operator operates one or more PLMNs. Each PLMN may be identified by a Mobile Country Code (MCC) and a Mobile Network Code (MNC). PLMN information of a cell is included in system information and broadcasted.

In PLMN selection, cell selection, and cell reselection, various types of PLMNs may be considered by the terminal.

Home PLMN (HPLMN): PLMN having MCC and MNC matching with MCC and MNC of a terminal IMSI.

Equivalent HPLMN (EHPLMN): PLMN serving as an equivalent of an HPLMN.

Registered PLMN (RPLMN): PLMN successfully finishing location registration.

Equivalent PLMN (EPLMN): PLMN serving as an equivalent of an RPLMN.

Each mobile service consumer subscribes in the HPLMN. When a general service is provided to the terminal through the HPLMN or the EHPLMN, the terminal is not in a roaming state. Meanwhile, when the service is provided to the terminal through a PLMN except for the HPLMN/EHPLMN, the terminal is in the roaming state. In this case, the PLMN refers to a Visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

The following is a detailed description of a procedure of selecting a cell by a terminal.

When power is turned-on or the terminal is located in a cell, the terminal performs procedures for receiving a service by selecting/reselecting a suitable quality cell.

A terminal in an RRC idle state should prepare to receive a service through the cell by always selecting a suitable quality cell. For example, a terminal where power is turned-on just before should select the suitable quality cell to be registered in a network. If the terminal in an RRC connection state enters in an RRC idle state, the terminal should selects a cell for stay in the RRC idle state. In this way, a procedure of selecting a cell satisfying a certain condition by the terminal in order to be in a service idle state such as the RRC idle state refers to cell selection. Since the cell selection is performed in a state that a cell in the RRC idle state is not currently determined, it is important to select the cell as rapid as possible. Accordingly, if the cell provides a wireless signal quality of a predetermined level or greater, although the cell does not provide the best wireless signal quality, the cell may be selected during a cell selection procedure of the terminal.

A method and a procedure of selecting a cell by a terminal in a 3GPP LTE is described with reference to 3GPP TS 36.304 V8.5.0 (2009-03) "User Equipment (UE) procedures in idle mode (Release 8)".

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. A cell reselection priority provided through broadcast signaling may refer to a common priority. A cell reselection priority for each terminal set by a network may refer to a dedicated priority. If receiving the dedicated priority, the terminal may receive a valid time associated with the dedicated priority together. If receiving the dedicated priority, the terminal starts a validity timer set as the received valid time together therewith. While the valid timer is operated, the terminal applies the dedicated priority in the RRC idle mode. If the valid timer is expired, the terminal discards the dedicated priority and again applies the common priority.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S Q_{meas,s} + Q_{hyst}, R_n = Q_{meas,n} - Q_{offset}$$ [Equation 1]

Here, $R_s$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset} = Q_{offsets,n}$, and when the UE does not receive $Q_{offsets,n}$, $Q_{offset} = 0$.

In the inter-frequency, when the UE receives the offset $Q_{offsets,n}$ for the corresponding cell, $Q_{offset} = Q_{offsets,n} + Q_{frequency}$, and when the UE does not receive $Q_{offsets,n}$, $Q_{offset} = Q_{frequency}$.

When the ranking criterion Rs of the serving cell and the ranking criterion Rn of the neighbor cell are changed in a similar state, the ranking order is frequently reversed as the changing result, and as a result, the UE may alternately reselect the two cells. Qhyst is a parameter for preventing the UE from alternately reselecting the two cells by giving the hysteresis in the cell reselection.

The UE measures the Rs of the serving cell and the Rn of the neighbor cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

Hereinafter, radio link monitoring (RLM) will be described.

The UE monitors downlink quality based on a cell-specific reference signal in order to detect the downlink radio link quality of the PCell. The UE estimates the downlink radio link quality for monitoring the downlink radio link quality and compares the estimated quality with threshold values Qout and Qin. The threshold value Qout is defined as a level in which the downlink radio link may not be stably received, and corresponds to a block error rate of 10% of hypothetical PDCCH transmission by considering a PDFICH error. The threshold value Qin is defined a downlink radio link quality level which may be more stably received than the level of the Qout and corresponds to a block error rate of 2% of hypothetical PDCCH transmission by considering a PCFICH error.

Hereinafter, a radio link failure (RLF) will be described.

The UE continuously performs the measurement in order to maintain the quality of the radio link with the serving cell receiving the service. The UE determines whether the communication is impossible in the current situation due to deterioration of the quality of the radio link. When the communication is almost impossible due to the low quality of the serving cell, the UE determines the current situation as a radio link failure.

When the radio link failure is determined, the UE gives up the communication maintenance with the current serving cell, selects a new cell through the cell selection (or cell reselection) procedure, and attempts the RRC connection re-establishment to the new cell.

In a specification of 3GPP LTE, cases where the normal communication is impossible are exemplified below:
  a case where the UE determines that there is a serious problem in the downlink communication link quality based on the radio quality measuring result of the PHY layer (determines that the quality of the PCell is low during the RLM.
  a case where the UE determines that there is a problem in the uplink transmission when a random access procedure is continuously failed in a MAC sub-layer.
  a case where the UE determines that there is a problem in the uplink transmission when uplink data transmission is continuously failed in an RLC sub-layer.
  a case where the UE determines that the handover is failed.
  a case where a massage received by the UE does not pass through an integrity check.

Hereinafter, the RRC connection re-establishment procedure will be described in more detail.

Figure 7:
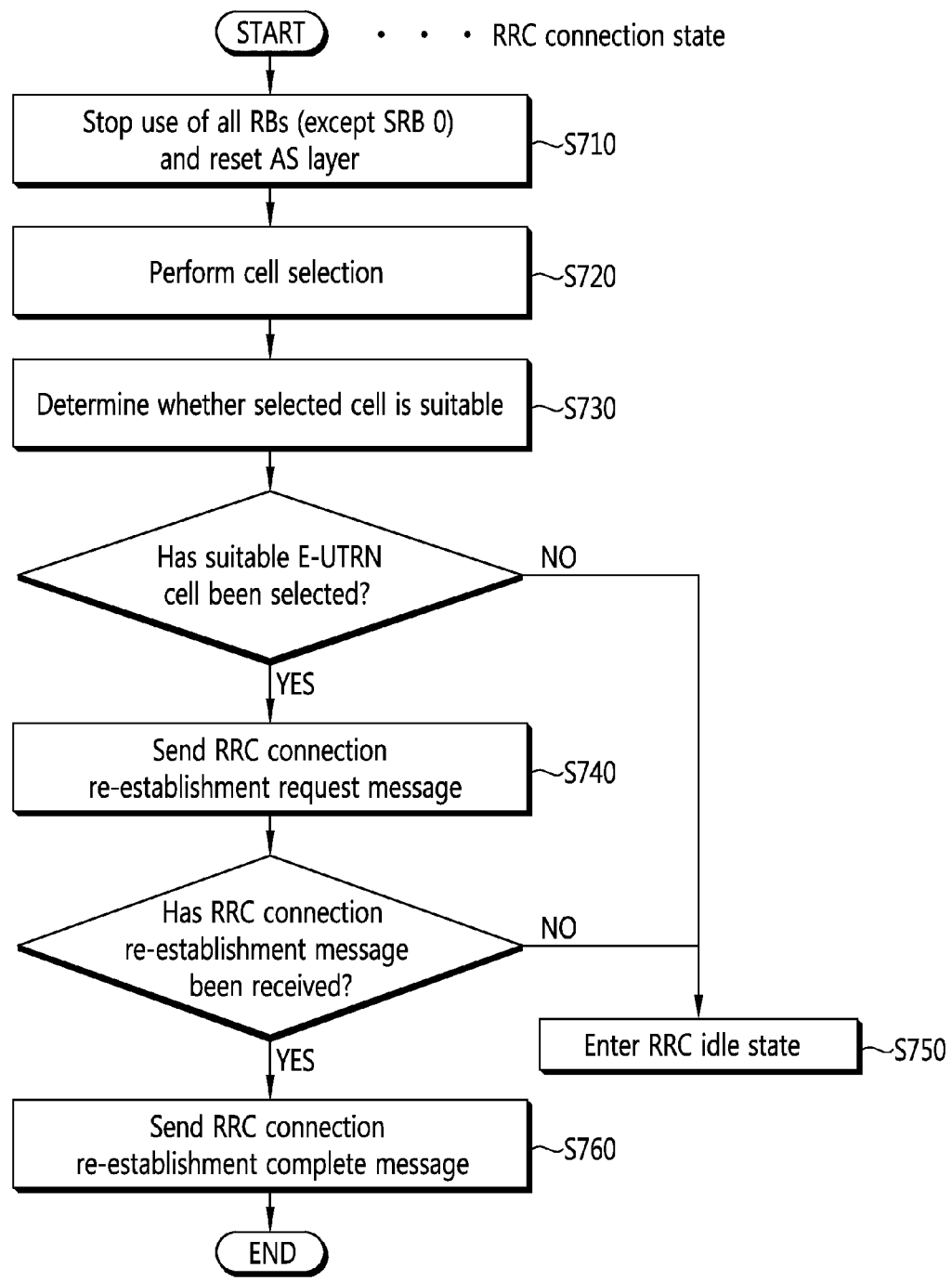
FIG. 7 is a diagram illustrating a RRC connection re-establishment procedure.

FIG. 7 is a diagram illustrating a RRC connection re-establishment procedure.

Referring to FIG. 7, the UE stops the used of all radio bearers which have been set except for signaling radio bearer #0 (SRB 0) and initializes each sub-layer of the AS (S710). Further, each sub-layer and the PHY layer are set as a default configuration. The UE maintains the RRC connection state during such a process.

The UE performs a cell selection procedure for performing the RRC connection reconfiguration procedure (S720). The cell selection procedure in the RRC connection reconfiguration procedure may be performed the same as the cell selection procedure performed in the RRC idle state of the UE even though the UE maintains the RRC connection state.

The UE verifies the system information of the corresponding cell to determine whether the corresponding cell is a suitable cell or not, after performing the cell selection procedure (S730). When it is determined that the selected cell is the suitable E-UTRAN cell, the UE transmits an RRC connection reestablishment request message to the corresponding cell (S740).

Meanwhile, when it is determined that the cell selected through the cell selection procedure for performing the RRC connection reestablishment procedure is the cell using the RAT other than the E-UTRAN, the UE stops the RRC connection reestablishment procedure and enters the RRC idle state (S750).

The UE may be implemented so that the cell selection procedure and the suitability verification of the cell by receiving the system information of the selected cell are finished within a limited time. To this end, the UE may drive a timer according to the starting of the RRC connection reestablishment procedure. The timer may stop when it is determined that the UE selects the suitable cell. When the timer ends, the UE may regard that the RRC connection reestablishment procedure is failed and enter the RRC idle state. The timer is hereinafter referred to as a radio link failure timer. In LTE specification TS 36.331, a timer called T311 may be used as the radio link failure timer. The UE may acquire the setting value of the timer from the system information of the serving cell.

In the case of receiving and accepting the RRC connection reestablishment request message from the UE, the cell transmits a RRC connection reestablishment message to the UE.

The UE receiving the RRC connection reestablishment message from the cell reconfigures the PDCP sub-layer and the RLC sub-layer for the SRB1. Further, the UE calculates various key values related with security setting and reconfigures the PDCP sub-layer responsible for the security with newly calculated security key values. As a result, the SRB1 between the UE and the cell is opened, and the RRC control message may be transmitted and received. The UE completes the restarting of the SRB1, and transmits to the cell an RRC connection reestablishment complete message that the RRC connection reestablishment procedure is completed (S760).

On the contrary, in the case of receiving and rejecting the RRC connection reestablishment request message from the UE, the cell transmits a RRC connection reestablishment reject message to the UE.

When the RRC connection reestablishment procedure is successfully performed, the cell and the UE perform the RRC connection reestablishment procedure. As a result, the UE restores a state before performing the RRC connection reestablishment procedure and maximally secures continuity of the service.

Next, a report of the RLF will be described.

When the RLF is generated or a handover failure is generated, the UE reports such a failure event to the network in order to support mobility robustness optimisation (MRO) of the network.

After the RRC connection reestablishment, the UE may provide the RLF report to the eNB. The radio measurement included in the RLF report may be used as a potential cause of the failure in order to identify coverage problems. This information may be used for excluding the events in the MRO evaluation for the intra-LTE mobility connection failure and transmitting the events as inputs for other algorithms.

When the RRC connection reestablishment is failed or the UE does not perform the RRC connection reestablishment, the UE is reconnected in the idle mode to generate the valid RLF report for the eNB. For the purpose, the UE stores information on the latest RLF or the handover failure, and may indicate to the LTE cell that the RLF report is valid every subsequent RRC connection (re)establishment and handover, until the RLF report is asked by the network or for 48 hours after the RLF or the handover failure is detected.

The UE maintains the information for the state transition and the RAT change, and returns to the LTE RAT and then indicates the RLF report is valid again.

The validity of the RLF report in the RRC connection configuration procedure indicates that the UE receives disturbance such as connection failure and the RLF report is not transmitted to the network due to the failure. The RLF report from the UE includes the following information.

E-CGI of a last cell (in the case of RLF) which provided the service to the UE or a handover target. When the E-CGI is not known, PCI and frequency information are used instead.

E-CGI of the cell which attempted to reestablishment.

E-CGI to the cell which provided the service to the UE, when the last handover is initialized, for example, message 7 (RRC connection reconfiguration) is received by the UE.

Time from the last handover initialization to the connection failure information indicating whether the connection failure is due to the RLF or the handover failure radio measurements position of the failure The eNB receiving the RLF failure from the UE may forward the report to the eNB which has provided the service to the UE before the reported connection failure. The radio measurements included in the RLF report may be used for identifying coverage issues as a potential cause of the radio link failure. This information may be used for excluding the events from the MRO evaluation of the intra-LTE mobility connection failure and transmitting the events as the input of other algorithms.

Hereinafter, a measurement and a measurement report will be described.

In a mobile communication system, supporting mobility of UE is required. Accordingly, the UE continuously measures a quality for a serving cell that provides a current service and a quality for a neighbor cell. The UE reports a measurement result to a network at an appropriate time and a network provides optimal mobility to the UE through a handover, and the like. Commonly, the measurement for the purpose is called a radio resource management (RRM) measurement.

The UE may perform a measurement for a specific purpose set by the network and reports a measurement result thereof to the network, in order to provide information to help a provider to operate the network in addition to the purpose of supporting the mobility. For example, the UE receives broadcast information of a specific cell determined by the network. The UE may report to the serving cell a cell identity (also referred to as a global cell identity) of the specific cell, position identification information (for example, tracking area code) to which the specific cell belongs, and/or other cell information (for example, whether a closed subscriber group (CSG) cell is member).

When the UE which is moving verifies that a quality in a specific region is very bad through the measurement, positional information and a measurement result regarding cells of which the qualities are bad may be reported to the network. The network may attempt optimization of the network based on the report of the measurement result of the UEs that help operating the network.

In a mobile communication system in which a frequency reuse factor is 1, mobility is most achieved among different cells which are in the same frequency band. Accordingly, in order to well guarantee the mobility of the UE, the UE needs to well measure qualities and cell information of neighbor cells having center frequencies which is the same as a center frequency of the serving cell. A measurement for the cell having the center frequency which is the same as the center frequency of the serving cell as described above is called an intra-frequency measurement. The UE reports the measurement result to the network at an appropriate time by performing the intra-frequency measurement to achieve the purpose of the corresponding measurement result.

A mobile communication provider may operate the network by using a plurality of frequency bands. When a service of the communication system is provided through the plurality of frequency bands, the UE may need to well measure qualities and cell information of neighbor cells having center frequencies which are different from the center frequency of the serving cell, in order to guarantee optimal mobility for the UE. As described above, a measurement for the cell having the center frequency which is different from the center frequency of the serving cell is called an inter-frequency measurement. The UE may need to report the measurement result to the network at an appropriate time by performing the inter-frequency measurement.

When the UE supports a measurement for the network based on an RAT, the UE may perform a measurement for a cell of the corresponding network by a configuration by the base station. The measurement is called an inter-RAT measurement. For example, the RAT may include a UMTS terrestrial radio access network (UTRAN) and a GSM EDGE radio access network (GERAN) that follow a 3GPP standard specification and may also include a CDMA 2000 system that follows a 3GPP2 standard specification.

Figure 8:
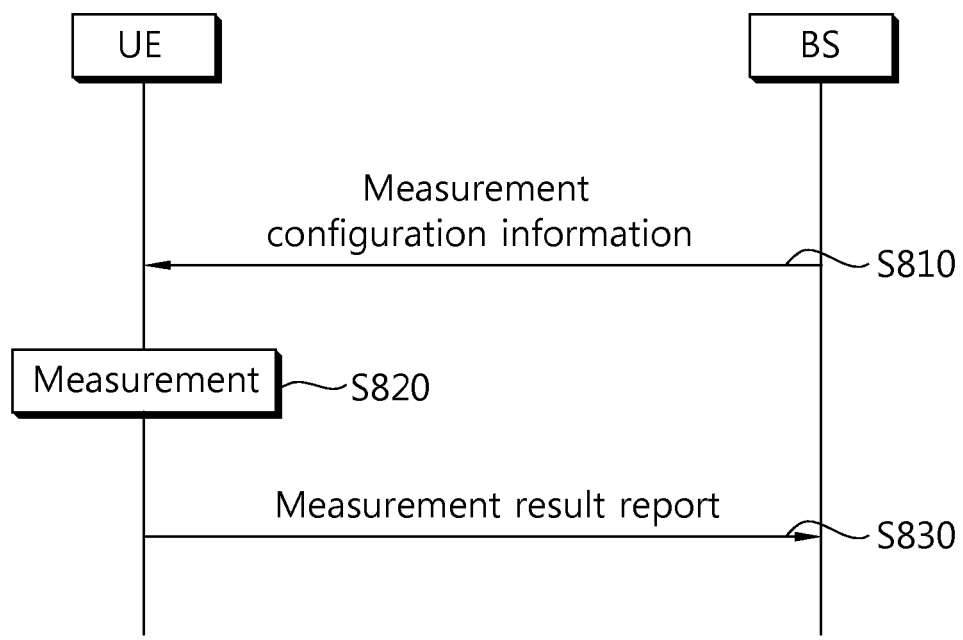
FIG. 8 is a flowchart illustrating a method for performing measurement in the related art.

FIG. 8 is a flowchart illustrating a method for performing measurement in the related art.

The UE receives measurement configuration information from the base station (S810). A message including the measurement configuration information is called a measurement configuration message. The UE performs the measurement based on the measurement configuration information (S820). The UE reports the measurement result to the base station when the measurement result satisfies a reporting condition in the measurement configuration information (S830). A message including the measurement result is called a measurement reporting message.

The measurement configuration information may include the following information.

(1) Measurement object information: The measurement object information is information on an object for which the UE is to perform a measurement. A measurement object may include at least one of an intra-frequency measurement object which is an object of an intra-cell measurement, an inter-frequency measurement object which is an object of an inter-cell measurement, and an inter-RAT measurement object which is an object of an inter-RAT measurement. For example, the intra-frequency measurement object may indicate the neighbor cell having the same frequency band as the serving cell, the inter-frequency measurement object may indicate the neighbor cell having the different frequency band from the serving cell, and the inter-RAT measurement object may indicate a neighbor cell of RAT different from the RAT of the serving cell.

(2) Reporting configuration information: The reporting configuration information is information on a reporting condition and a reporting type regarding the time when the UE reports the measurement result. The reporting condition may include information on an event or a cycle in which reporting the measurement result is triggered. The reporting type is information regarding a configuration type of the measurement result.

(3) Measurement identity information: is information on a measurement identity when the terminal reports a certain object to be measured in a certain type by associating an object to be measured with a report setting. The measurement identity information is included in a measurement report message so that a measurement result is related to a certain object to be measured, and may indicate that a measurement report is generated as a certain report condition.

(4) Quantity configuration information: represents information on a parameter for setting filtering of a measurement unit, report unit and/or measurement result value.

(5) Measurement gap information: The measurement gap information is information on a measurement gap which is an interval which the UE may use for only measurement without considering data transportation with the serving cell because downlink transportation or uplink transportation is not scheduled.

The UE has a measurement object list, a measurement reporting configuration list, and a measurement identity list in order to perform a measurement procedure.

In the 3GPP LTE, the base station may configure only one measurement object for one frequency band to the UE. According to Clause 5.5.4 of 3GPP TS 36.331 V8.5.0 (2009-03) "Evolved Universal Terrestrial Radio Access (E-UTRA) Radio Resource Control (RRC); Protocol specification (Release 8)", events that trigger the measurement reporting shown in the following table are defined.

TABLE 1

| Events | Reporting conditions |
| --- | --- |
| Event A1 | Serving becomes better than threshold |
| Event A2 | Serving becomes worse than threshold |
| Event A3 | Neighbour becomes offset better than serving |
| Event A4 | Neighbour becomes better than threshold |
| Event A5 | Serving becomes worse than threshold1 and neighbour becomes better than threshold2 |
| Event B1 | Inter RAT neighbour becomes better than threshold |
| Event B2 | Serving becomes worse than threshold1 and inter RAT neighbour becomes better than threshold2 |

When the measurement result of the UE satisfies the configured event, the UE transports the measurement reporting message to the base station.

Figure 9:
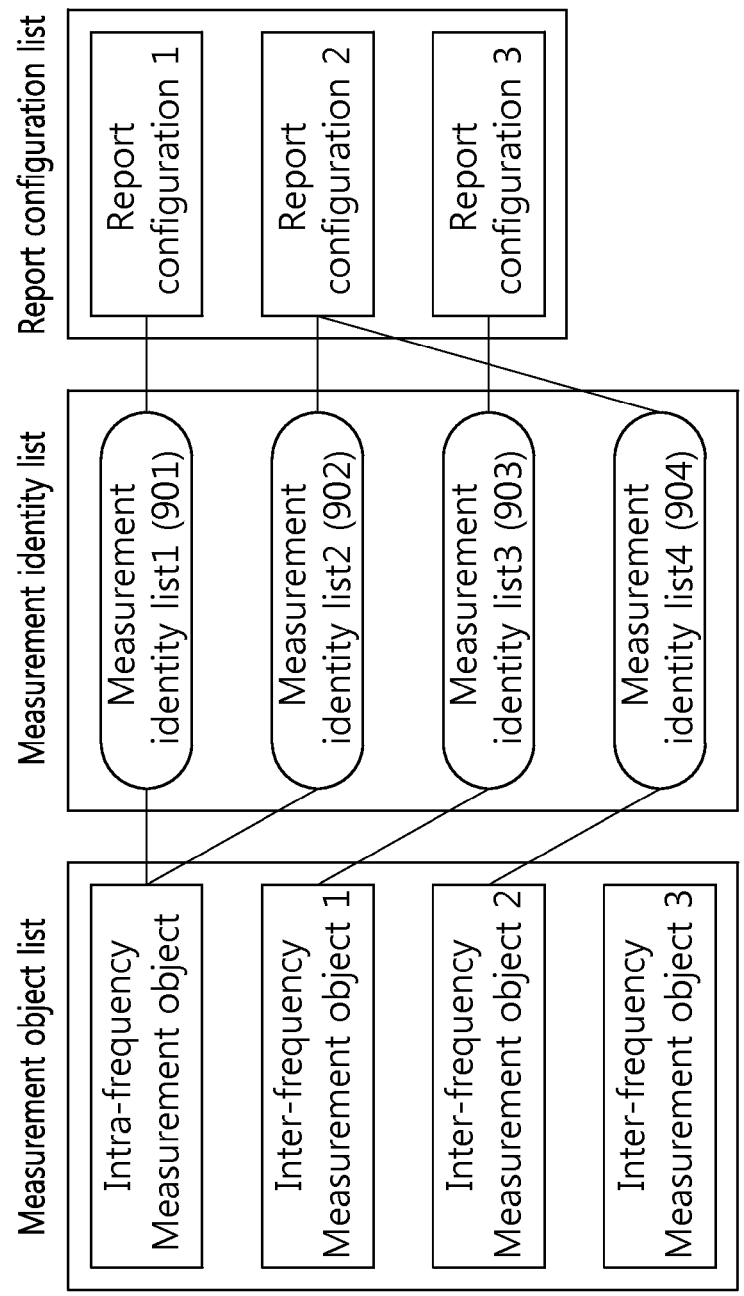
FIG. 9 illustrates an example of a measurement configuration which is configured to user equipment.

FIG. 9 illustrates an example of a measurement configuration which is configured to user equipment.

First, measurement identity 1 901 connects the intra-frequency measurement object and reporting configuration 1. The UE performs intra frequency measurement and the reporting configuration 1 is used to determine a reference and a reporting type of reporting the measurement result.

Measurement identity 2 902 is connected with the intra-frequency measurement object similarly to the measurement identity 1 901, but the intra-frequency measurement object is reporting configuration 2. The UE performs measurement and the reporting configuration 2 is used to determine the reference and the reporting type of reporting the measurement result.

By the measurement identity 1 901 and the measurement identity 2 902, the UE transports the measurement result even though the measurement result for the intra-frequency measurement object satisfies any one of the reporting configuration 1 and the reporting configuration 2.

Measurement identity 3 903 connects inter-frequency measurement object 1 and reporting configuration 3. When a measurement result for the inter-frequency measurement object 1 satisfies a reporting condition included in the reporting configuration 1, the UE reports the measurement result.

Measurement identity 4 904 connects the inter-frequency measurement object 2 and the reporting configuration 2. When a measurement result for the inter-frequency measurement object 2 satisfies a reporting condition included in the reporting configuration 2, the UE reports the measurement result.

Meanwhile, the measurement object, the reporting configuration, and/or the measurement identity may be added, changed, and/or deleted. These may be instructed when the base station sends a new measurement configuration message or a measurement configuration change message to the UE.

Figure 10:
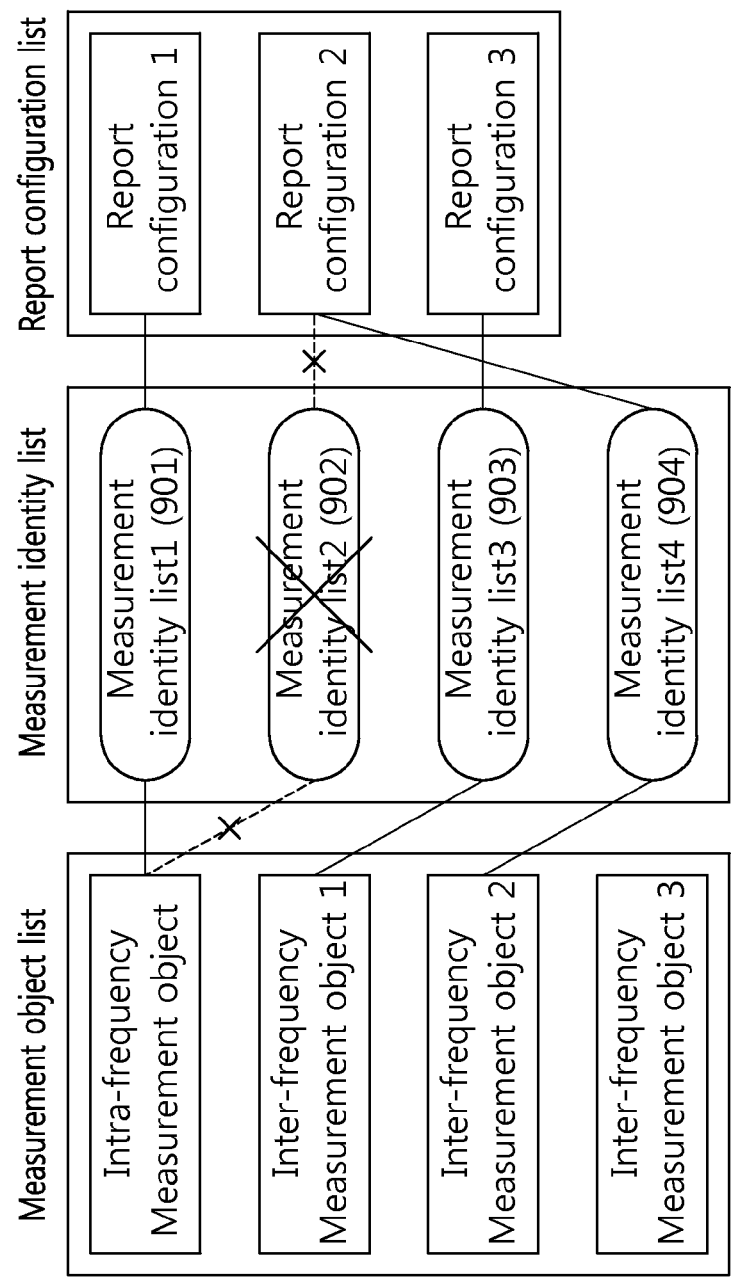
FIG. 10 illustrates an example of deleting a measurement identity.

FIG. 10 illustrates an example of deleting a measurement identity. When the measurement identity 2 902 is deleted, measurement for a measurement object associated with the measurement identity 2 902 is stopped and a measurement report is not transported. A measurement object or a reporting configuration associated with the deleted measurement identity may not be changed.

Figure 11:
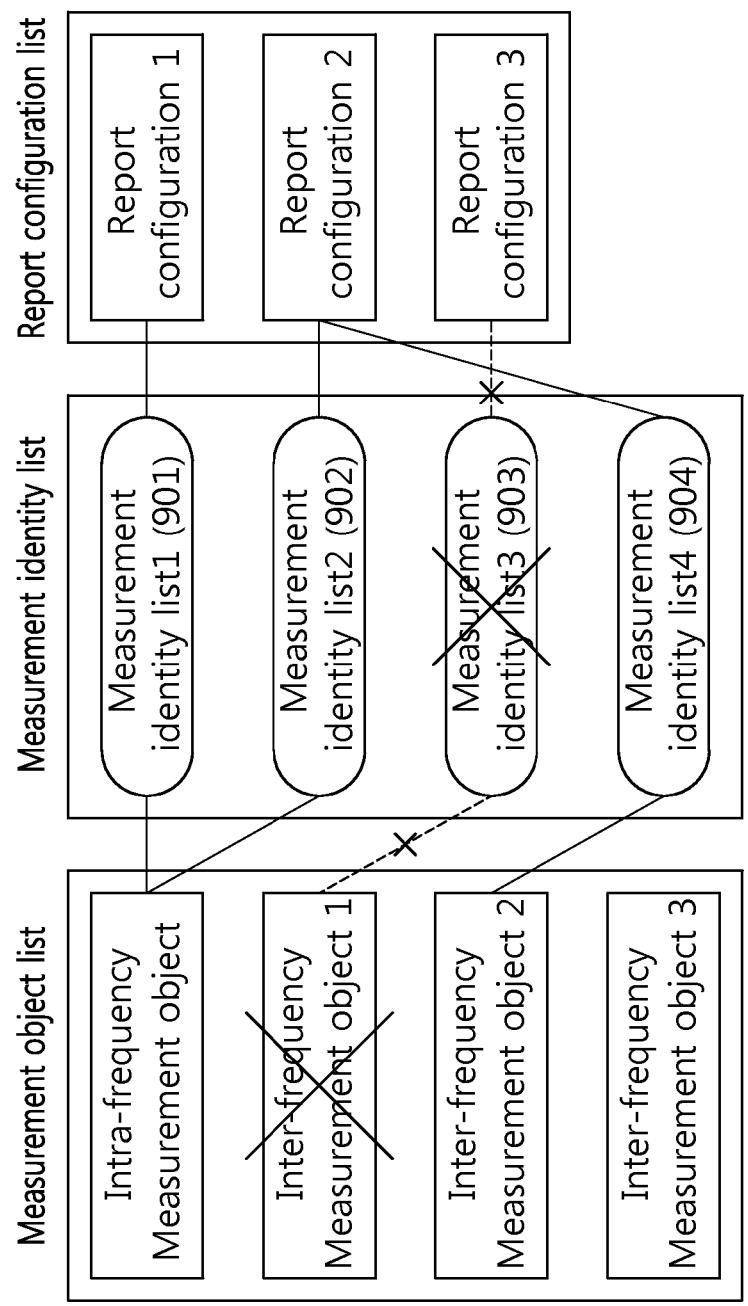
FIG. 11 illustrates an example of deleting a measurement object.

FIG. 11 illustrates an example of deleting the measurement object. When the inter-frequency measurement object 1 is deleted, the UE deletes even the measurement identity 3 903 associated therewith. Measurement for the inter-frequency measurement object 1 is stopped and a measurement report is not also transported. However, a reporting configuration associated with the deleted inter-frequency measurement object may not be changed or deleted.

When the reporting configuration is removed, the UE removes even a measurement identity associated therewith. The UE stops measurement for an associated measurement object by the associated measurement identity. However, the measurement object associated with the deleted reporting configuration may not be changed or deleted.

The measurement report may include the measurement identity, a measured quality of the serving cell, and a measurement result of the neighbor cell. The measurement identity identifies a measurement object in which the measurement report is triggered. The measurement result of the neighbor cell may include a cell identity and a measurement quality of the neighbor cell. The measured quality may include at least one of reference signal received power (RSRP) and reference signal received quality (RSRQ).

A current wireless communication system uses various reference signals in order to provide information on a communication environment to a counterpart device through uplink or downlink.

As one of reference signals, a Cell specific Reference Signal (CRS) is transmitted for each sub-frame in order to recognize channel information upon transmission of downlink. In this case, different temporal/frequency domains are allocated and transmitted to four antennas according to 4 which is the number of maximum antenna ports supported from downlink of a wireless communication system. In an existing wireless communication system, Channel State Information (CSI) is acquired for channel estimation or the CRS may be used for Radio Resource Monitoring (RRM) measurement and demodulation.

Meanwhile, a recent wireless communication system supports a downlink transmission scheme through maximum 8 antennas. Accordingly, the above transmission scheme may not be supported by the CRS defined with respect to four antennas. In addition, in a measurement side based on the CRS, transmission of the CRS every sub-frame may lower a wireless resource use efficiency due to overhead.

In order to compensate for the above problem, a Channel State Information Reference Signal (CSI-RS) is introduced as a reference signal to acquire channel state information. The terminal may acquire channel state information through channel estimation by performing measurement based on the CSI-RS. The existing CRS may be implemented to be used for measuring an RRM by introducing the CSI-RS. Further, a Demodulation Reference Signal (DM-RS) may be separately provided for demodulation.

Hereinafter, Coordinated Multi-Point transmission and reception (CoMP) will be described.

In a cellular network, since interference from a neighbor cell is low, a cell center zone may support an additional antenna port regardless of transmission of the neighbor cell or may increase a data transmission rate through carrier aggregation.

Meanwhile, since an outer peripheral portion of the cell may be significantly interfered with a neighbor cell, it may be difficult to transmit data through increase of the antennas or carrier aggregation. The CoMP is suggested to minimize mutual interference when peripheral cells of the terminal perform coordinated communication and provide a better service by improving a data transmission rate in an environment such as an outer peripheral portion of the cell where interference may be significantly operated. The CoMP is a technology which is applicable to a situation where a macro cell and a pico cell or a Femto cell coexist as well as an interference environment between macro cells.

Figure 12:
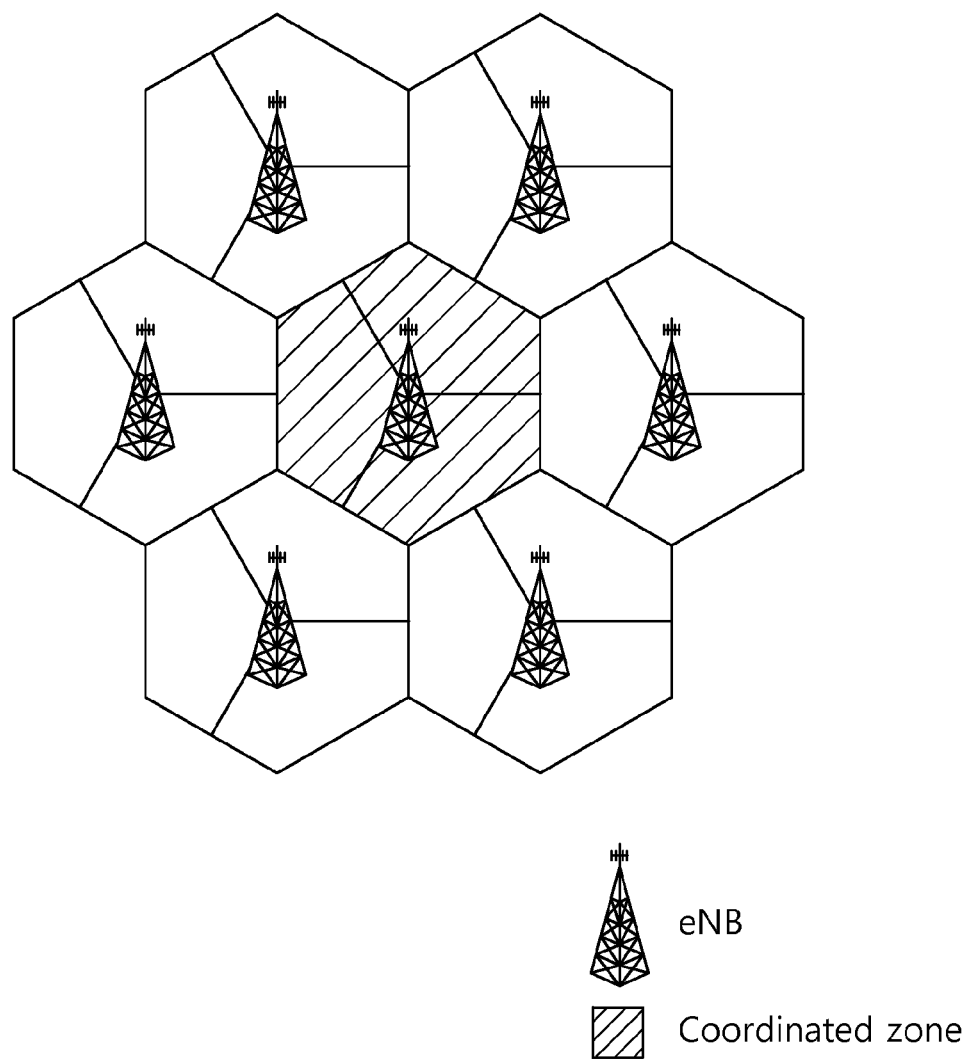
FIGS. 12-14 illustrate scenarios with application of the CoMP.
Figure 14:
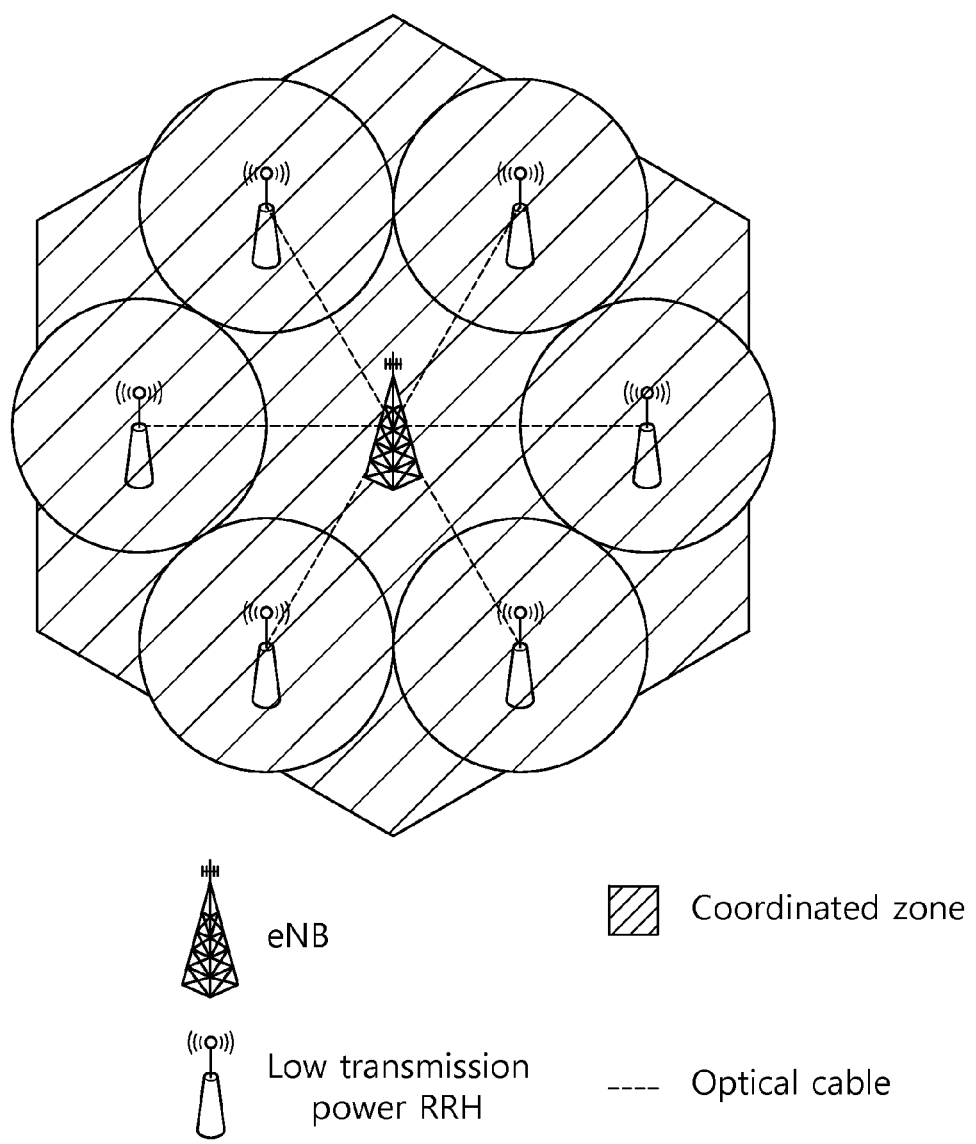

A scenario with application of the CoMP may be illustrated in FIGS. 12 and 14.

A first scenario shown in FIG. 12 indicates a case where coordinated communication between sectors in one base station is achieved (Homogeneous network with intra-site CoMP).

Figure 13:
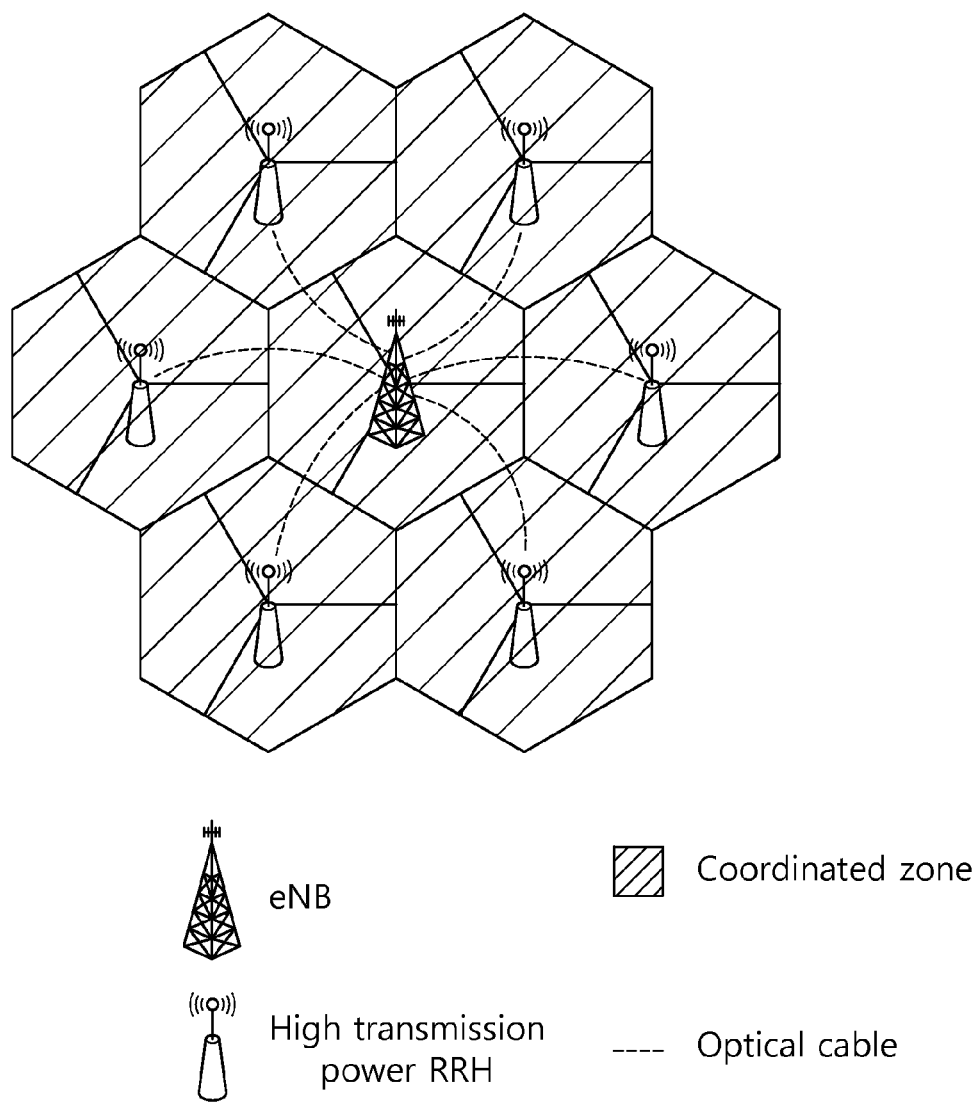

A second scenario shown in FIG. 13 indicates a case where coordinated communication is achieved between base stations in an environment in which an optical cable is located between base stations (Homogeneous network with high Tx power Remote Radio Heads (RRHs)).

Third and fourth scenarios shown in FIG. 14 assume a heterogeneous network environment where Transmission Points (TPs) having different transmission powers exit. That is, the coordinated communication is achieved between low power radio heads and high power radio heads arranged in a macro cell zone.

The third scenario is a case where the low power radio head has a cell ID. That is, the third scenario considers coordinated transmission between the macro cell and a pico cell in a heterogeneous network.

The third scenario indicates a case where low power radio heads have the same cell ID as that of the macro cell. That is, the fourth scenario considers a Distributed Antenna System (DAS) which is coordinated transmission between radio heads spreading at a full region of the macro cell.

When the CoMP is applied, following schemes are considered in a coordinated scheme between TPs.

Coordinated scheduling: Mutual coordinated TPs minimize interference by suitably adjusting temporal or frequency resources transmitting a signal and increase a quality of a signal received by the terminal Coordinated beamforming: Mutual coordinated TPs minimize interference in another TP by suitably adjusting a direction of a beam formed for transmitting a signal and increase a quality of a signal received by the terminal Joint processing: Mutual coordinated TPs simultaneously transmit a signal to one terminal or dynamically selects an optimal TP considering a channel situation of the terminal to transmit the signal to the terminal When base station coordinated communication is used, a serving terminal sets a Channel State Information-Reference Signal (CSI-RS) resource of each TP in the terminal so that the terminal may measure a channel state between another TP and the terminal except for the serving cell. The terminal measures a CSI-RS resource of each TP, and acquires information on a channel state with respect to a corresponding TP. The terminal measures a CSI-RS resource to acquire CSI-RS resource results and reports the acquired CSI-RS resource results to the serving cell. The serving cell may share the CSI-RS measurement results acquired from the terminal with a peripheral TP associated with coordinated communication.

To recognize channel state information with respect to each TP by a plurality of TPs in an environment involved in terminal communication may exert great influence upon a throughput with respect to the terminal and efficiency of a wireless resource use. In order to accomplish the above object, the terminal may measure channel state information and may report measurement results in a network. However, when the channel state information is frequently reported, a wireless resource is consumed so that availability to be acquired using a plurality of TPs may be deteriorated. There is a need for a method for efficiently measuring and reporting channel state information by taking into consideration a trade-off relation.

The present invention provides a method of configuring at least one CSI-RS resource, performing measurement based on the set CSI-RS resource, and selectively reporting the CSI-RS measurement results to a network. The reported CSI-RS results are used by the network so that the terminal may be suitably and set and operated by selecting an optimized CoMp scheme/operation.

Figure 15:
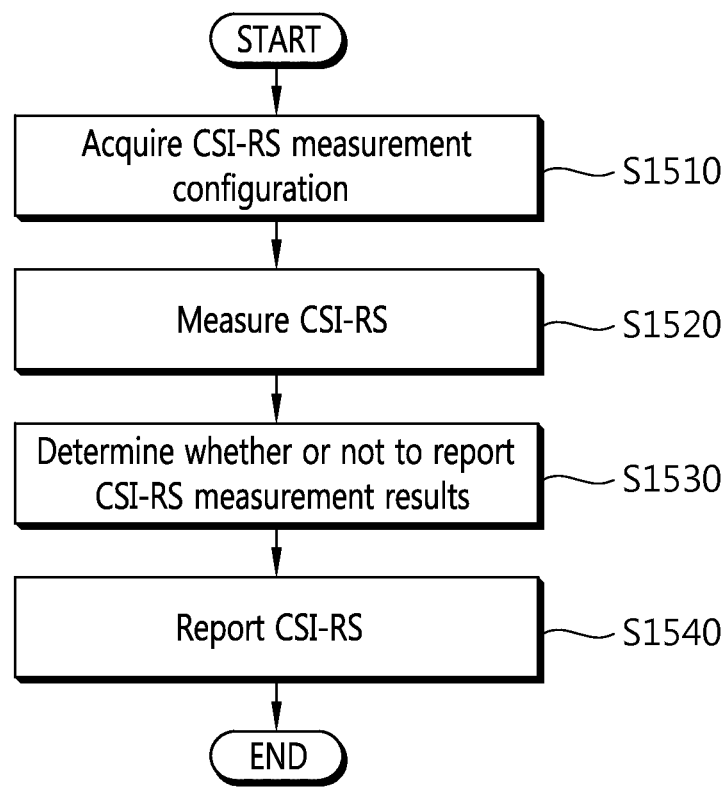
FIG. 15 is a flowchart illustrating a method for measuring and reporting a CSI-RS according to an embodiment of the present invention.

FIG. 15 is a flowchart illustrating a method for measuring and reporting a CSI-RS according to an embodiment of the present invention.

Referring to FIG. 15, a terminal acquires a CSI-RS measurement configuration from a network (S1510). The CSI-RS measurement configuration may be included in a measurement configuration message transmitted by a network to measure and report an RRM of the terminal to be transmitted.

The CSI-RS measurement configuration may indicate a plurality of CSI-RS resources which are an object to be measured by the terminal Each CSI-RS resource to be measured and/or to be reported if possible by the terminal is engaged with each CSI-RS ID, and may be identified therethrough. The terminal may identify the CSI-RS through different CSI-RS IDs. Each CSI-RS resource may be configured to measure the CSI-RS with respect to each TP. Each CSI-RS resource may correspond to a specific TP.

The CSI-RS measurement configuration may include information indicating to report best N CSI-RS measurement resources having a high quality level among measurement results. In this case, the terminal may determine whether or not to report the best N CSI-RS measurement results, and may report the best N CSI-RS measurement results.

The CSI-RS measurement configuration may include information to specify a CSI-RS report reference triggering report of the CSI-RS measurement results.

The terminal measures the configured CSI-RS resource (S1520). The terminal may acquire CSI-RS measurement results with respect to CSI-RS resources, respectively by measuring the CSI-RS resource allocated to each TP. The CSI-RS measurement result may include a quality measurement result with respect to a reference signal. The CSI-RS measurement result may include a quality measurement result with respect to the reference signal. The CSI-RS resource measurement of the terminal may be continuously performed after determining whether or not to report the measurement results and/or performing a CSI-RS report. Accordingly, the CSI-RS measurement result being an object to be reported when the terminal determines whether or not to report may be differently configured according to the time.

The terminal determines whether or not to report the CSI-RS measurement results (S1530), and reports the CSI-RS (S1540). A detail method of determining whether or not to report the CSI-RS measurement results and reporting the CSI-RS may be suggested as a following embodiment.

1. Best N CSI-RS Measurement Report Scheme Based on Event

The CSI-RS measurement configuration by the network may be achieved so that the terminal reports best N CSI-RS resources having a high quality level of a measurement result. The network may include and transmit a measurement object CSI-RS resource list including a CSI-RS ID to identify CSI-RS resources in CSI-RS measurement configuration. The terminal regards the received CSI-RS resource list as CSI-RS measurement and best N CSI-RS report object.

If measurement results of the best N CSI-RS resources are updated, the terminal acquiring the CSI-RS measurement configuration may report the beast N CSI-RS measurement result being measurement results with respect to the updated best N CSI-RS resources and/or best N CSI-RS resources to the network. A reference to determine whether or not to update the best N CSI-RS resource will be described below.

a) First report: the terminal receives a CSI-RS measurement configuration, and measures a plurality of CSI-RS resources configured by the CSI-RS measurement configuration. If N CSI-RS measurement results are firstly identified, the terminal may transmit a measurement report message to the network. That is, presence of update of the CSI-RS resource associated with the first report may be evaluated according to whether the N CSI-RS measurement results with respect to N CSI-RS resources are acquired. The terminal may include measurement results with respect to the N CSI-RS resources and CSI-RS IDs capable of identifying the N CSI-RS resources in the measurement report message.

The measurement report message to be transmitted by the terminal may include a measurement report message which is an RRC message to be transmitted according to RRM measurement. The terminal may include a report indicator indicating that the transmitted measurement report message is transmitted according to a report condition of the best N CSI-RS measurement result in the measurement report message.

b) Next report: the terminal measures the configured CSI-RS resources after the first report. If the terminal determines that the best N CSI-RS resource is updated, the terminal may transmit the measurement report message to the network. The terminal may determine that the best N CSI-RS resources are updated based on following references.

When at least one resource included in a list of the best N CSI-RS resources according to recent measurement results is different from resources in a list of previously reported best N CSI-RS resources, the terminal may determine that the best N CSI-RS resources are updated. That is, regardless of a case where an order of a quality level of measurement results with respect to the best N CSI-RS resources is changed, presence of update is determined according to whether or not to change an element of the beast N CSI-RS resources according to a measurement result. For example, newly acquired CSI- RS measurement results correspond to the best N CSI-RS measurement results. If the associated CRI-RS resource is not included in the previously reported best N CSI-RS resources, the terminal may determine that the best N CSI-RS resources are updated. If the measurement results with respect to the previously reported best N CSI-RS resources depend on current measurement results, this does not correspond to the best N measurement results longer. This means that there is a need to report the best N CSI-RS resources according to new measurement results and/or measurement results thereof.

When an order in a best N CSI-RS resource list according to recent measurement results is different from a list of previously reported best N CSI-RS resources, the terminal may determine that the best N CSI-RS resources are updated. In this case, although recent best N CSI-RS resources are the same as previously reported N CSI-RS resources, if the quality level order is changed due to variation in a quality level of measurement results with respect to each CSI-RS resource, the terminal determines that the best N CSI-RS resources are updated. For example, newly acquired CSI-RS measurement results correspond to the best N CSI-RS measurement results. If the associated CRI-RS resource is not included in the previously reported best N CSI-RS resources, the terminal may determine that the best N CSI-RS resources are updated. That is, if elements of the best N CSI-RS resources are changed, the terminal may determine that the best N CSI-RS resources are updated. In addition, although the elements of the best N CSI-RSs are changed, when a quality level of measurement results varies so that the order is changed, the terminal may determine that the best N CSI-RS resources are updated.

If it is determined that the best N CSI-RS resources are updated, the terminal reports the measurement report message to the network. The terminal may include the measurement results with respect to the best N CSI-RS resources in a measurement report message. The terminal may include CSI-RS IDs capable of identifying N CSI-RS resources in the measurement report message.

The terminal may include a report indicator indicating that the transmitted measurement report message is transmitted according to a report condition of the best N CSI-RS measurement result in the measurement report message.

2. Scheme of Periodically Reporting Best N CSI-RS Measurement Result

The CSI-RS measurement configuration may include information indicating a period to report the CSI-RS measurement results by the terminal. In this case, the terminal may report a best N CSI-RS resource having the best quality level of a measurement result with respect to the CSI-RS resource and measurement results thereof.

a) First report: the terminal receives a CSI-RS measurement configuration, and measures a plurality of CSI-RS resources configured by the CSI-RS measurement configuration. If N CSI-RS measurement results are firstly identified, the terminal may transmit a measurement report message to the network. The measurement report message may include measurement results with respect to the N CSI-RS resources and CSI-RS IDs capable of identifying the N CSI-RS resources.

The terminal may include a report indicator indicating that the transmitted measurement report message is transmitted according to a report condition of the best N CSI-RS measurement result in the measurement report message.

The terminal may firstly transmit a measurement report message include best N CSI-RS measurement results, and may start a period timer. A value of the period timer may be set as a preset specific value or a value of period indication information included in the CSI-RS measurement configuration.

b) Next report: the terminal measures the configured CSI-RS resources after the first report. If the period timer is terminated, the terminal transmits the measurement report message to the network. The terminal may include measurement results with respect to the best N CSI-RS resources at a corresponding time point in the measurement report message and may include CSI-RS IDs capable of identifying the best N CSI-RS resources in the measurement report message.

The terminal may include a report indicator indicating that the transmitted measurement report message is transmitted according to a report condition of the best N CSI-RS measurement result in the measurement report message.

When transmitting the measurement report message, the terminal may again start the period timer.

3. Scheme of Including Best N CSI-RS Resources in a Measurement Report Triggered Due to the CSI-RS Measurement Results to Report The network may configure the CSI-RS measurement configuration including information defining a report reference with respect to the CSI-RS measurement results in the terminal. The terminal measures the CSI-RS resource according to the measurement configuration. If one or more CSI-RS measurement results satisfy a report condition according to the measurement configuration, the terminal transmits the measurement report message to the network. The terminal may include measurement results with respect to N CSI-RS resources and CSI-RS IDs capable of identifying the N CSI-RS resources in the measurement report message.

4. Scheme of Including the Best N CSI-RS Resources in a Measurement Report According to a Specific Measurement Configuration Achieved by the Network to Report The network may configure the CSI-RS measurement configuration including information defining a report reference with respect to the CSI-RS measurement results in the terminal. In addition, the network may include a report indicator indicating to report the best N CSI-RS measurement result in the CSI-RS measurement configuration.

The terminal measures the CSI-RS resource. If measurement results with respect to one or more CSI-RS resources satisfy a report condition of a measurement configuration including an indicator indicating the best N CSI-RS measurement result report, the terminal may include best N CSI-RS measurement results and/or associated CSI-RS ID in a message reporting measurement results with respect to the CSI-RS resource satisfying the report condition to transmit the message to the network.

Meanwhile, the measurement results with respect to one or more CSI-RS resources depend on a CSI-RS measurement configuration having no indicator indicating to report the best N CSI-RS measurement results, the terminal may include one or more CSI-RS measurement results satisfying a report condition and/or a corresponding CSI-RS ID in the measurement report message to transmit the measurement report message to the network.

The network may operate a CoMP with respect to the terminal through the best N CSI-RS measurement results acquired by receiving the measurement report message. The network may select a TP to transmit and receive to and from the terminal. This may be a TP where a CSI-RS measurement result is excellent, that is, a channel state with the terminal is excellent. Accordingly, the terminal may receive a better service through an efficient CoMP.

The above embodiment will be described with reference to the accompanying drawings.

Figure 16:
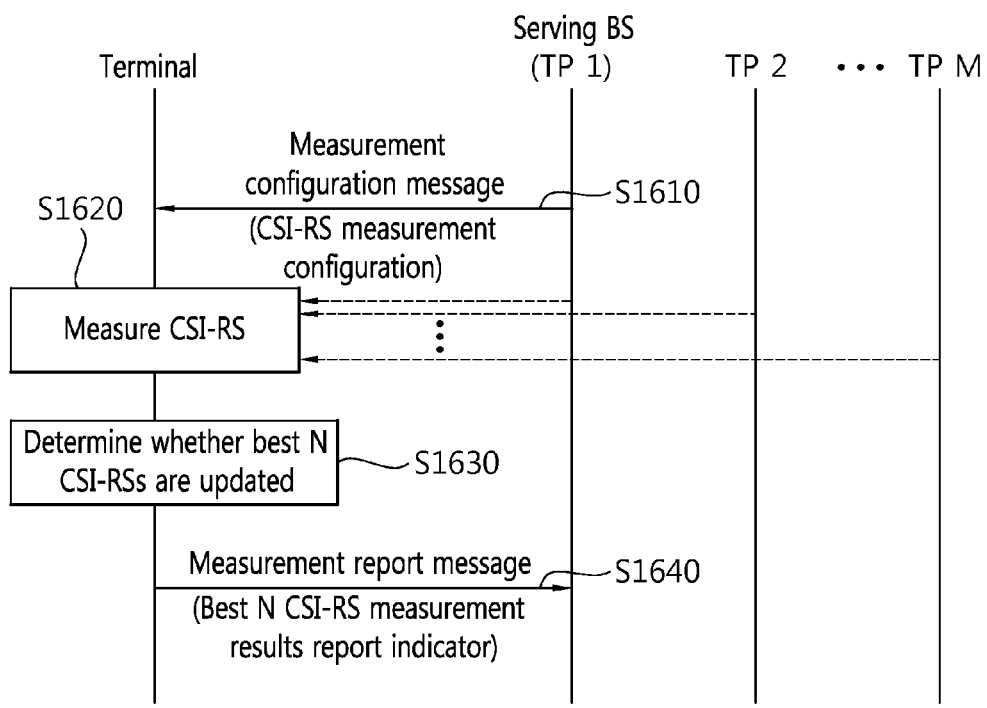
FIG. 16 is a flowchart illustrating an example of a method for measuring and reporting a CSI-RS according to an embodiment of the present invention.

FIG. 16 is a flowchart illustrating an example of a method for measuring and reporting a CSI-RS according to an embodiment of the present invention.

In an example shown in FIG. 16, it is assumed that the terminal may perform coordinated communication with a total M TPs including a serving BS TP 1.

Referring to FIG. 16, the terminal receives a measurement configuration message from a serving BS (S1610). The measurement configuration message may include a CSI-RS measurement configuration to measure and report the CSI-RS of the terminal. The CSI-RS measurement configuration includes information on a plurality of CSI-RS resources which are an object to be measured by the terminal. It is assumed in the embodiment of the present invention that the total number of CSI-RS resources for measurement and report of the terminal, and each CSI-RS resource may be identified according to a CSI-RS ID included in the measurement configuration.

The CSI-RS measurement configuration may include information indicating to report measurement results with best N CSI-RS resources having an excellent measurement quality level among total M CSI-RS resources by the terminal. In this case, the N may be set to be smaller than or equal to the M. The N may be set by the network or may be set by the terminal itself The terminal performs CSI-RS measurement with TP1 to TP M (S1620). Accordingly, the terminal may acquire measurement results with respect to each CSI-RS resource.

The terminal may determine whether or not to report the CSI-RS measurement results. In the present example, the terminal determines whether the best N CSI-RS resources are updated to report the best N CSI-RS measurement results (S1630). The terminal may determine whether the best N CSI-RS resources are updated corresponding to best N CSI-RS measurement result report indication included in the CSI-RS measurement configuration. The terminal may determine whether the best N CSI-RS resources are updated corresponding to a separate configuration of the network. The terminal may determine whether the best N CSI-RS resources are updated according to setting of the terminal itself When acquiring N CSI-RS measurement results in step S1620, a terminal which does not previously report a measurement report message including the CSI-RS measurement result may determine that the best N CSI-RS resources are updated.

When at least one resource in a list of best N CSI-RS resources is different from resources in a list of previously reported best N CSI-RS resources or an order in the best N CSI-RS resource list according to recent measurement results is different from an order in a list of the previously reported best N CSI-RS resources, the terminal previously reporting CSI-RS measurement results may determine that the best N CSI-RS resources are updated.

If the terminal determines that the best N CSI-RS resources are updated, the terminal transmits the measurement report message to the network (S1640). The measurement report message may include measurement results with respect to the best N CSI-RS resources and CSI-RS IDs capable of identifying the best N CSI-RS resources. The measurement report message is transmitted according to update of the best N CSI-RS resources, but is not transmitted because an RRM measurement result satisfies a report condition and is not transmitted because one or more CSI-RS measurement results satisfy the report condition. In order to report this to the network, the terminal may include a report indicator indicating that a measurement report message is satisfied by satisfying the best N CSI-RS report conditions in the measurement message.

Figure 17:
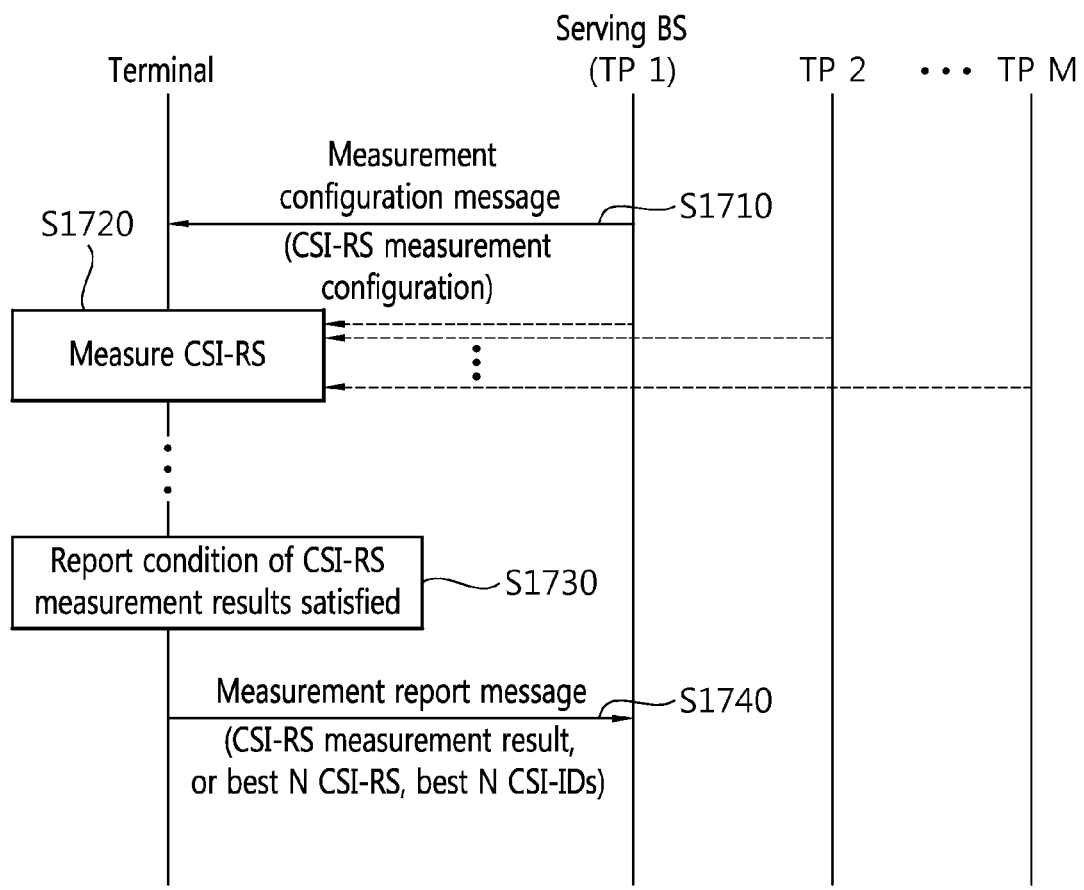
FIG. 17 is a flowchart illustrating another example of a method for measuring and reporting a CSI-RS according to an embodiment of the present invention.

FIG. 17 is a flowchart illustrating another example of a method for measuring and reporting a CSI-RS according to an embodiment of the present invention.

In an example shown in FIG. 17, it is assumed that the terminal may perform coordinated communication with a total M TPs including a serving BS TP 1.

Referring to FIG. 17, the terminal receives a measurement configuration message from a serving BS (S1710). The measurement configuration message may include a CSI-RS measurement configuration to measure and report the CSI-RS of the terminal. The CSI-RS measurement configuration includes information on a plurality of CSI-RS resources which are an object to be measured by the terminal. It is assumed in the embodiment of the present invention that the total number of CSI-RS resources for measurement and report of the terminal, and each CSI-RS resource may be identified according to a CSI-RS ID included in the measurement configuration. The CSI-RS measurement configuration may include information indicating a report reference of the CSI-RS measurement result.

The terminal performs CSI-RS measurement with TP1 to TP M (S1720). Accordingly, the terminal may acquire measurement results with respect to each CSI-RS resource.

The terminal may determine whether a report condition of the CSI-RS measurement results is satisfied (S1730). If a level of quality according to a measurement result with respect to at least one CSI-RS resource satisfies a report reference, the terminal may determine that the report condition of the CSI-RS measurement results is satisfied.

If the terminal determines that at least one CSI-RS measurement result satisfies the report condition, the terminal transmits a measurement report message to the network (S1740).

The terminal may include the CSI-RS measurement result satisfying the report condition in a measurement report message. The terminal may include a CSI-RS ID associated with a corresponding CSI-RS measurement result in a measurement report message.

The terminal may transmit the measurement report message by adding the best N CSI-RS measurement result including the CSI-RS measurement result satisfying the report condition in the measurement report message. The terminal may add the CSI-RS IDs capable of identifying best N CSI-RS resources to the measurement report message. If N CSI-RS measurement results are not acquired when one or more CSI-RS measurement results satisfy the report condition, the terminal may add the CSI-RS measurement results acquired at a corresponding time point and an associated CSI-RS ID or acquires N CSI-RS measurement result and add the measurement results and the associated CSI-RS ID to the measurement report message.

In the above embodiment, an 'N' of best N CSI-RS measurement results reported from the terminal may be a specific value set in the network. The N may be smaller than or equal to the set number of CSI-RS resources. Meanwhile, a fixed N value may be previously set in the terminal.

In the present invention, the channel state information is associated with the CSI-RS measurement results, but the channel state information is not limited to the CSI-RS measurement result. The embodiment of the present invention is applicable to a method for measuring and reporting various types of channel state information and wireless resource information required to be provided to the network.

According to the method for measuring and reporting the CSI-RS of the present invention, the terminal may report channel state information (e.g. CSI-RS measurement results) with respect to a plurality of TPs to the network through a more efficient method. The network may be set and operated to provide a more excellent quality service to the terminal in a coordinated communication side through best N CSI-RS measurement results. Wireless resource consumption may be reduced and a processing rate of a service provided to the terminal may be efficiently improved by applying an embodiment of the present invention.

Figure 18:
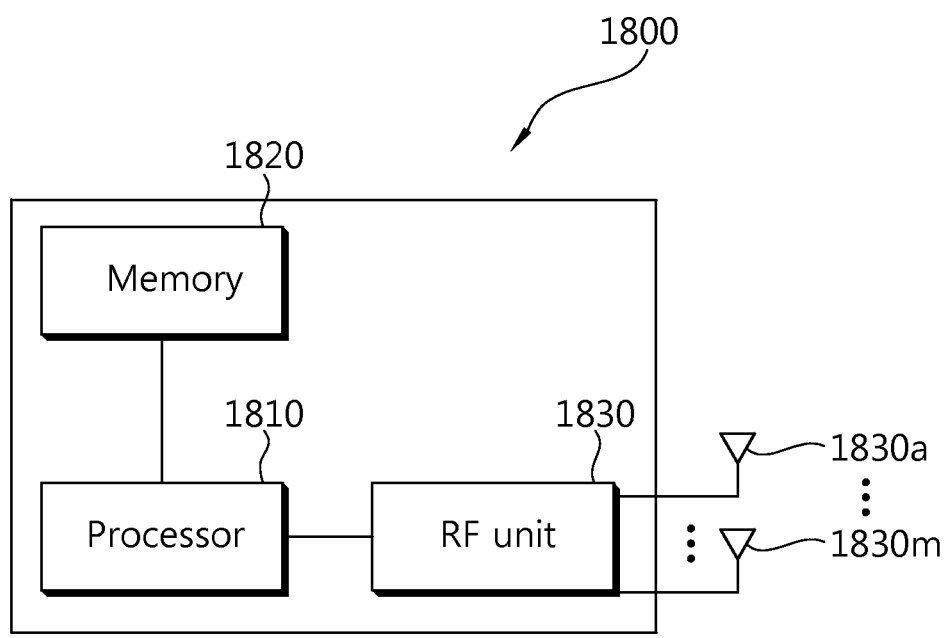
FIG. 18 is a block diagram illustrating a wireless apparatus according to an embodiment of the present invention.

FIG. 18 is a block diagram illustrating a wireless apparatus according to an embodiment of the present invention. The wireless apparatus may implement operation of a terminal and/or a network performing the above embodiment with reference to FIGS. 15 to 17.

The wireless apparatus 1800 includes a processor 1810, a memory 1820, and a radio frequency (RF) unit 1830. The processor 1810 performs the proposed functions, processes and/or methods. The processor 1810 may measure CSI-RS wireless resources according to a provided CSI-RS measurement configuration. The processor 1810 may be configured to determine whether to report the CSI-RS measurement results to the network. The processor 1810 may be configured to selectively report the CSI-RS measurement results according to a quality level of the measurement results. The processor 1810 may be configured to set CoMP operation in the terminal based on the reported measurement results. The processor 1810 may be configured to implement the embodiment of the present invention with reference to FIGS. 15 to 17.

The RF unit 1830 is connected to the processor 1810, and sends and receives radio signals. The RF unit (1830) may include a plurality of antennas 1830a to 1830m. Each antenna may be implemented to simultaneously transmit and receive to and from another wireless apparatus, a base station, and/or a TP.

The processor 1810 and the RF unit 1830 may be implemented to send and receive radio signals according to one or more communication standards. The RF unit 1830 may include one or more transceivers capable of sending and receiving radio signals.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method for measuring and reporting a channel state information-reference signal (CSI-RS) by a user equipment (UE) in a wireless communication system, the method comprising:
    receiving a CSI-RS configuration from a network, the CSI-RS configuration including information indicating a plurality of CSI-RS resources which is an object to be measured;
    measuring the plurality of CSI-RS resources in order to acquire a plurality of CSI-RS measurement results;
    determining whether a specific number of CSI-RS resources associated with a specific number of CSI-RS measurement results is updated; and
    transmitting a measurement report message to the network when the specific number of the CSI-RS resources is updated,
    wherein the measurement report message includes the specific number of CSI-RS measurement results, a specific number of CSI-RS IDs and a report indicator,
    wherein the specific number of CSI-RS measurement results has a higher level of quality from among the plurality of CSI-RS measurement results,
    wherein the specific number of CSI-RS IDs identifies the specific number of CSI-RS resources associated with the specific number of CSI-RS measurement results,
    wherein the report indicator indicates whether the specific number of CSI-RS measurement results is updated, and
    wherein the specific number of CSI-RS resources is updated when the specific number of CSI-RS IDs for the specific number of CSI-RS resources is different from a specific number of CSI-RS IDs which is previously transmitted.

2. The method of claim 1, wherein the determining whether the specific number of CSI-RS resources is updated includes:
    determining that the specific number of CSI-RS resources is updated when the specific number of CSI-RS measurement results is acquired where the UE does not previously transmit a measurement report message including the CSI-RS measurement result to the network.

3. The method of claim 2, wherein the determining whether the specific number of CSI-RS resources is updated includes:
    determining that the specific number of CSI-RS resources is updated when a specific number of previously transmitted CSI-RS resource associated with the specific number of CSI-RS measurement results which is previously transmitted is different from the specific number of the CSI-RS resources Where the UE previously transmits the measurement report message including the CSI-RS measurement result to the network.

4. The method of claim 2, wherein the determining whether the specific number of CSI-RS resources is updated includes:
    determining that the specific number of CSI-RS resources is updated when a quality level order of measurement results with respect to the specific number of previous CSI-RS resources is different from a quality order of measurement results with respect to the specific number of the CSI-RS resources where the UE previously transmits the measurement report message including the CSI-RS measurement result to the network.

5. The method of claim 1, wherein the measurement configuration message further includes information indicating a CSI-RS measurement result report period of the UE.

6. The method of claim 5, further comprising:
   starting a period timer set at the CSI-RS measurement result report period corresponding to transmission of the measurement report message; and
   transmitting a next measurement report message when the period timer is terminated,
   wherein the next measurement report message includes the specific number of CSI-RS measurement results having a higher level of quality from among the plurality of CSI-RS measurement results acquired by the UE when the period timer is terminated.

7. The method of claim 1, wherein the CSI-RS measurement configuration includes information indicating a CSI-RS measurement result report reference.

8. The method of claim 7, wherein the determining whether or not to report the CSI-RS measurement results includes:
   determining whether at least one of the plurality of CSI-RS measurement results satisfies the CSI-RS measurement result report reference; and
   transmitting the measurement report message to the network when the CSI-RS measurement result report reference is satisfied.

9. The method of claim 1, wherein the plurality of CSI-RS resources includes measurement resources with respect to a plurality of transmission points (TPs) participating in coordinated multi-point transmission and reception (CoMP) operation with the UE.

10. The method of claim 1, wherein the CSI-RS configuration is included in a measurement configuration set when the network measures and reports radio resource monitoring (RRM) in the terminal, and
    the measurement report message includes a radio resource control (RRC) to be transmitted corresponding to the measurement configuration.

11. An Apparatus for measuring and reporting a channel state information-reference signal (CSI-RS) in a wireless communication system, the apparatus comprising:
    a Radio Frequency (RF) unit configured to send and receive radio signals; and
    a processor that is functionally coupled to the RF unit and operates, the processor configured to:
       receive a CSI-RS configuration from a network, the CSI-RS configuration including information indicating a plurality of CSI-RS resources which is an object to be measured,
       measure the plurality of CSI-RS resources in order to acquire a plurality of CSI-RS measurement results,
       determine whether a specific number of CSI-RS resources associated with the specific number of CSI-RS measurement results is updated, and
       transmit a measurement report message to the network when the specific number of the CSI-RS resource is updated,
    wherein the measurement report message includes the specific number of CSI-RS measurement results, a specific number of CSI-RS IDs and a report indicator,
    wherein the specific number of CSI-RS measurement results has a higher level of quality from among the plurality of CSI-RS measurement results,
    wherein the specific number of CSI-RS IDs identifies the specific number of CSI-RS resources associated with the specific number of CSI-RS measurement results,
    wherein the report indicator indicates whether the specific number of CSI-RS measurement results is updated, and
    wherein the specific number of CSI-RS resources is updated when the specific number of CSI-RS IDs for the specific number of CSI-RS resources is different from a specific number of CSI-RS IDs which is previously transmitted.

* * * * *